(12) United States Patent
El Defrawy et al.

(10) Patent No.: US 9,449,177 B1
(45) Date of Patent: Sep. 20, 2016

(54) GENERAL PROTOCOL FOR PROACTIVELY SECURE COMPUTATION

(71) Applicant: HRL Laboratories, LLC, Malibu, CA (US)

(72) Inventors: Karim El Defrawy, Santa Monica, CA (US); Joshua W. Baron, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 45 days.

(21) Appl. No.: 14/054,655

(22) Filed: Oct. 15, 2013

Related U.S. Application Data

(60) Provisional application No. 61/780,795, filed on Mar. 13, 2013, provisional application No. 61/780,638, filed on Mar. 13, 2013, provisional application No. 61/780,757, filed on Mar. 13, 2013.

(51) Int. Cl.
*H04L 9/28* (2006.01)
*G06F 21/60* (2013.01)
*H04L 9/08* (2006.01)

(52) U.S. Cl.
CPC ............... *G06F 21/60* (2013.01); *H04L 9/085* (2013.01); *H04L 9/088* (2013.01); *H04L 2209/04* (2013.01); *H04L 2209/42* (2013.01)

(58) Field of Classification Search
None
See application file for complete search history.

(56) References Cited

U.S. PATENT DOCUMENTS

| | | | | |
|---|---|---|---|---|
| 4,926,479 | A | * | 5/1990 | Goldwasser et al. .......... 713/180 |
| 5,625,692 | A | * | 4/1997 | Herzberg et al. .............. 380/286 |
| 7,327,847 | B2 | * | 2/2008 | Cachin .................... H04L 9/302 |
| | | | | 380/286 |

OTHER PUBLICATIONS

R. Thorbek, Proactive Linear Integer Secret Sharing, In Proceedings of IACR Cryptology ePrint Archive 2009, 183-183.*
Rafail Ostrovsky and Moti Yung. How to withstand mobile virus attacks (extended abstract). Principles of Distributed Computing (PODC), pp. 51-59, 1991.
Oded Goldreich Foundations of Cryptography: Basic Tools. Section 1.3. Cambridge University Press New York, NY, 2000.
Oded Goldreich Foundations of Cryptography: vol. II: Basic Applications. Cambridge University Press. New York, NY, 2004.
Paul Feldman. A practical scheme for non-interactive verifiable secret sharing. IEEE Symposium on Foundations of Computer Science, pp. 427-437. IEEE, 1987.
Ivan Damgard and Jesper Buus Nielsen. Scalable and unconditionally secure multiparty computation. In CRYPTO, pp. 572-590, 2007.

(Continued)

*Primary Examiner* — Fatoumata Traore
(74) *Attorney, Agent, or Firm* — Tope-McKay & Associates

(57) ABSTRACT

Described is a system for proactively secure multi-party computation (MPC). Secret shares representing data are constructed to perform computations between a plurality of parties modeled as probabilistic polynomial-time interactive turing machines. A number of rounds of communication where the plurality of parties jointly compute on the secret shares is specified. Additionally, a threshold of a number of the plurality of parties that can be corrupted by an adversary is specified. The secret shares are periodicially refreshed and reshared among the plurality of parties before and after computations in each of the rounds of communication. The data the secret shares represent is proactively secured.

19 Claims, 4 Drawing Sheets

(56) References Cited

OTHER PUBLICATIONS

Eli Ben-Sasson, Serge Fehr, and Refail Ostrovsky. Near-linear unconditionally-secure multiparty computation with a dishonest minority, In CRYPTO, pp. 663-680, 2012.

Hertzberg et al., "Proactive Secret Sharing," Advances in Cryptology—CRYPT0' 95, Lecture Notes in Computer Science vol. 963, 1995, pp. 339-352.

* cited by examiner

| | |
|---|---|
| Number of rounds | $O(D)$ |
| Minimal number of rounds per refreshment phase | 8 |
| Minimal number of rounds per refreshment phase | 3 |
| Minimal number of rounds per computation phase | $n/4$ |
| Averaged number of corruptions per round of interaction | $n/44$ |
| Bandwidth | $O(Cn^2\kappa + Dn^2\kappa)$ |
| Computational Complexity | $O(Cn^2\kappa + Dn^2\kappa)$ |

GENERAL PROTOCOL FOR PROACTIVELY SECURE COMPUTATION

CROSS-REFERENCE TO RELATED APPLICATIONS

This is a Non-Provisional patent application of U.S. Provisional Application No. 61/780,795, filed in the United States on Mar. 13, 2013, entitled, "General Protocol for Proactively Secure Computation."

This is ALSO a Non-Provisional patent application of U.S. Provisional Application No. 61/780,638, filed in the United States on Mar. 13, 2013, entitled, "An Efficient Protocol for Mobile Proactive Secret Sharing."

This is ALSO a Non-Provisional patent application of U.S. Provisional Application No. 61/780,757, filed in the United States on Mar. 13, 2013, entitled, "An Efficient Protocol for Mobile Proactive Secure Multiparty Computation (MPMPC) Using Commitments."

BACKGROUND OF THE INVENTION (1) Field of Invention

The present invention relates to a system for proactively secure computation and, more particularly, to a system for proactively secure general multiparty computation.

(2) Description of Related Art

Secure multi-party computation (MPC) enables parties to jointly compute a function over their inputs, while at the same time keeping these inputs private. The purpose of a proactively secure MPC is to allow for the secure execution of a computation by multiple parties (i.e., greater than two) while maintaining functionality and security even in the face of significant successful corruption of parties participating in the computation.

Previous work on proactively secure MPC was performed by Ostrovsky and Yung (see the List of Incorporated Cited Literature References, Literature Reference No. 1). While their work instantiated the idea of proactive security, their protocol has not been reexamined since 1991, and many innovations have since occurred in the realm of proactive security. Furthermore, the work of Ostrovsky and Yung did not consider the explicit specification of security of their scheme. In particular, the number of parties that can be corrupted at any one time is unspecified. In addition, Ostrovsky and Yung rely on write-only memory that an adversary can write viruses to. For instance, a party that scans the data later might become corrupted upon scanning.

Thus, a continuing need exists for a proactively secure MPC with a specified protocol that examines the number of parties that can be corrupted at any particular round of communication of the protocol. Further, a need exists for a proactively secure MPC protocol that is not susceptible to an adversary storing a virus in local memory that can recorrupt a party when it is briefly scanned.

SUMMARY OF THE INVENTION

The present invention relates to system for proactively secure computation and, more particularly, to a system for proactively secure general multiparty computation. The system comprises one or more processors and a memory having instructions such that when the instructions are executed, the one or more processors perform multiple operations. Secret shares representing data are constructed to perform computations between a plurality of parties modeled as probabilistic polynomial-time interactive turing machines. A number of rounds of communication where the plurality of parties jointly compute on the secret shares is specified. Additionally, a threshold of a number of the plurality of parties that can be corrupted by an adversary is specified. Secret shares are periodically refreshed and reshared among the plurality of parties before and after computations in each of the rounds of communication. The data the secret shares represent is proactively secured.

In another aspect, the proactively secure MPC proceeds in phases, wherein a phase comprises a plurality of consecutive rounds of communication, where each round belongs to one phase, and wherein each phase is one of a refreshment phase or an operation phase, wherein during an operation phase, a functionality is computed and during a refreshment phase, the data is rerandomized.

In another aspect, a refreshment phase comprises an opening period and a closing period, and wherein a stage comprises an opening refreshment period, an operation phase, and a closing refreshment period, wherein stages are executed consecutively, and wherein no more than t parties can be corrupted at any stage by the adversary.

In another aspect, the system executes, during the closing refreshment period, a share renewal subprotocol on selected set of secret shares, wherein during the share renewal subprotocol, the selected set of secret shares are simultaneously renewed to generate newly random shares that are still secret shares.

In another aspect, the system executes, during the opening refreshment period, a share reconstruction subprotocol on a selected set of secret shares, wherein during the share reconstruction subprotocol, a party $P_r$ is corrupted and, after being corrupted, wants to recover its lost secret shares, wherein the plurality of parties construct a random polynomial and send party $P_r$ values of the random polynomial so that party $P_r$ can interpolate it to recover the lost secret shares.

In another aspect, the operation phase comprises a dynamic preprocessing phase for preprocessing data as needed throughout the operation phase.

As can be appreciated by one skilled in the art and in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is a table showing that the proactively secure MPC is secure against n/4 cheating parties according to principles of the present invention;

DETAILED DESCRIPTION

Figure 1:
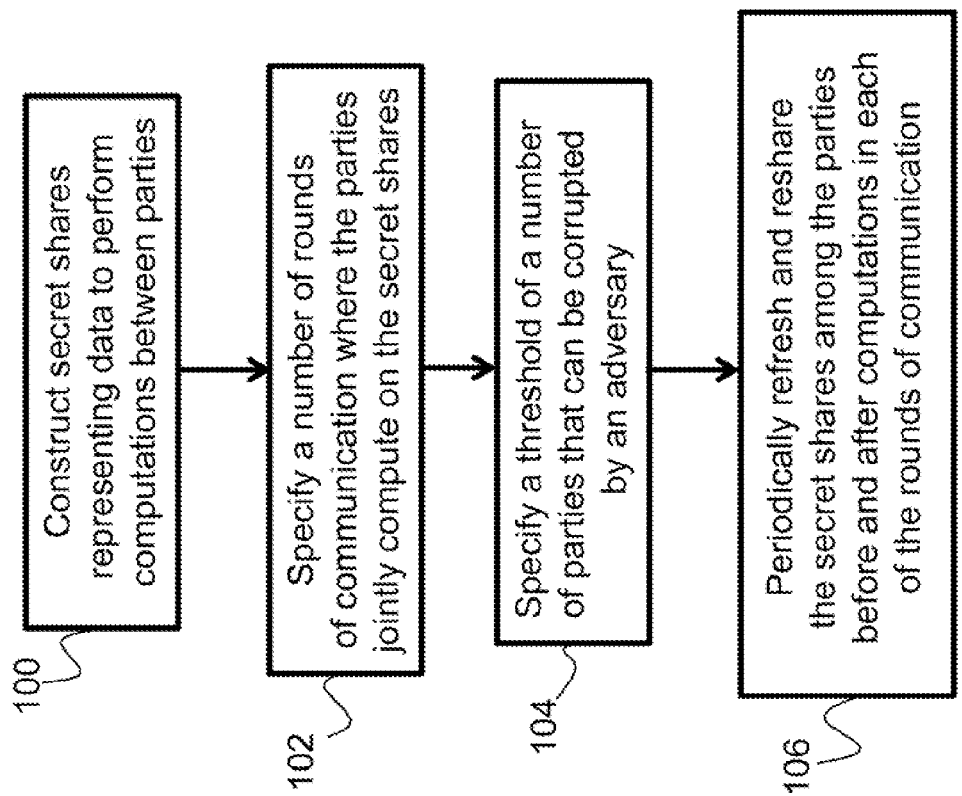
FIG. 1 is a flow diagram of a system for proactively secure multiparty computation (MPC) according to principles of the present invention.

The present invention relates to a system for proactively secure computation and, more particularly, to a system for proactively secure general multiparty computation. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Incorporated Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. Rafail Ostrovsky and Moti Yung. How to withstand mobile virus attacks (extended abstract). Principles of Distributed Computing (PODC), pages 51-59, 1991.
2. Oded Goldreich. Foundations of Cryptography: Basic Tools. Section 1.3. Cambridge University Press. New York, N.Y., 2000.
3. Oded Goldreich. Foundations of Cryptography, Volume II: Basic Applications. Cambridge University Press. New York, N.Y., 2004.
4. Paul Feldman. A practical scheme for non-interactive verifiable secret sharing. IEEE Symposium on Foundations of Computer Science, pages 427-437. IEEE, 1987.
5. Ivan Damgard and Jesper Buus Nielsen. Scalable and unconditionally secure multiparty computation. In CRYPTO, pages 572-590, 2007.
6. Eli Ben-Sasson, Serge Fehr, and Rafail Ostrovsky. Near-linear unconditionally-secure multiparty computation with a dishonest minority. In CRYPTO, pages 663-680, 2012.

(2) Principal Aspects

The present invention has three "principal" aspects. The first is a system for proactively secure computation. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for proactively secure computation. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instructions" as used with respect to this invention generally indicates a set of operations to be performed on a computer, and may represent pieces of a whole program or individual, separable, software modules. Non-limiting examples of "instructions" include computer program code (source or object code) and "hard-coded" electronics (i.e., computer operations coded into a computer chip). The "instructions" may be stored on any non-transitory computer-readable medium such as a floppy disk, a CD-ROM, a flash drive, and in the memory of a computer.

(3) Introduction

In the following, the assumptions under which the proactively secure multi-party computation (MPC) protocol was constructed are first described. Then, various terms necessary to describe the proactive setting are defined. Subsequently, the preliminary protocols that aid in the construction of the MPC protocol are presented. Finally, the subprotocols required for the proactively secure MPC protocol are outlined, and the final MPC protocol is specified.

The proactively secure MPC protocol of the present invention is based on a secure MPC protocol that uses secret shares to do the computation. Typically, such secure protocols specify rounds of communication where parties jointly compute on these shares. Therefore, if these shares are periodically refreshed and reshared among the parties before and after the computations in each of the rounds of the original secure protocol, the panies can still compute using the secret shares, but the data these shares represent is being proactively secured and, therefore, the whole MPC protocol is proactively secured.

(4) Specific Details

Described below is a proactively secure multi-party computation (MPC) protocol instantiated with step-by-step details. Specifically, the invention included a protocol by which a group of n parties can jointly and securely compute the functionality even in the face of persistent, successful corruption of up to n/4 of the parties at any one time. Such computation is subject to the assumption that parties can periodically refresh themselves to a pristine, uncorrupted state. In addition, the protocol described herein has a corruption rate well above previously considered schemes. While corruption rates are generally expressed over an arbitrary period of time, a more accurate measure of the number of corruptions tolerated is a bound on the maximal number of parties that can be corrupted at each round of communication of the protocol. The reason that the protocol of the present invention allows for more corrupt parties is that the number of rounds of communication per interaction (or stage) is smaller than for previous descriptions. Finally, the protocol requires no updates to memory other than brief local updates. Each of these aspects will be described in further detail below.

(4.1) Assumptions

Listed below are the various assumptions used for the proactively secure MPC protocol. One can assume n parties modeled as probabilistic polynomial-time (PPT) interactive Turing machines (ITMs) (see Literature Reference No. 2, sections 1.3 and 4.2.1) and that the threshold of corrupted parties during any one period is k.

1. Assume a PPT adversary.
2. Assume the synchronous model of communication (see Literature Reference No. 3, section 7.1.1).
3. Assume a broadcast channel that has communication overhead linear in the message size to communicate to all n parties.
4. Assume an adversary cannot corrupt the random inputs of a party. That is, an adversary corrupting a party at one time cannot predict the randomness used by the party at another uncorrupted time in the future.
5. Assume public key infrastructure trusted platform module (PKI-TPM) which is the following: If party $P_i$ sends a message to party $P_j$ using $P_j$'s public key, party $P_j$ has trusted hardware that will decrypt it. This is so that one does not have to refresh secret keys.
6. Assume trusted setup. That is, the parties are allowed to have one round of interaction before being corrupted. This is so parties can send secret shares of their inputs without verification.
7. Assume that a party is able to completely erase any stored information that the party wishes. That is, once erased, such data may not be restored even by a computationally unbounded adversary.
8. Assume that the number of parties is $O(\kappa)$, where $\kappa$ is a security parameter. For the purpose of the present invention, $O(f(x))$ is a class of functions such that $g(x)$ is a member of $O(f(x))$ if and only if there is a constant c and a number $m>0$ such that $|g(x)| \leq c|f(x)|$ for all $x>m$.
9. Assume that the circuit is "wide enough": the width of the circuit at each depth is $O(\kappa)$.
10. Assume that the circuit is "data efficient" in the sense that data generated at one depth of the circuit is completely used within a small additional depth further "down" the circuit.

(4.2) Proactive Setting

The setting in which the proactively secure MPC protocols are constructed is described below. MPC protocol $\pi$ is defined for n parties $P_1, \ldots, P_n$, where, each party $P_i$ is modeled as an interactive Turing machine (ITM). A protocol may execute while interacting with an adversary, which is modeled as an interactive Turing machine A that models external adversarial activity. MPC protocol $\pi$ proceeds in consecutive communication rounds that are denoted by $r_{i,l}$, where the initial round is round 0,0. A proactive protocol proceeds in phases. A phase, denoted ph consists of a number of consecutive rounds $r_{i,l}, \ldots, r_{i+j,l}$, and every round $r_{j,l}$ belongs to exactly one phase $ph_i$. Each phase of $\pi$ is either a refreshment phase or an operation phase, which occur alternately. Each refreshment phase $ph_i$ consisting of rounds $r_{i,l}, \ldots, r_{i+j,l}$ is such that there exists a k, $0<k<j$ such that rounds $r_{i,l}, \ldots, r_{i+k,l}$ are denoted as the closing period of refreshment phase $ph_i$, while $r_{i+k+1,l}, \ldots, r_{i+j,l}$ denote the opening period of refreshment phase $ph_i$. Finally, a stage st (starting at stage 0) consists of an opening refreshment period, an operation phase, and then a closing refreshment period; therefore, it includes a full (operation) phase and two sequences of two refreshment stages. Thus, each refreshment is the closing of one stage and the opening of the other. Stages are executed consecutively, and the number of stages is equal to the number of operation phases, which is assumed to be a priori defined. There is an exception to the refreshment-operation-refreshment stage configuration: the first stage starts with an operation phase, and the last stage ends with an operation phase. $r_\pi$ denotes the maximal number of rounds that any stage in the execution of $\pi$ consists of. The intuition is that during the operation phases, the protocol computes the functionality that it was designed for, whereas refreshment phases are used to re-randomize the data.

(4.2.1) Environment Interaction in the Real-World Execution

The adversary A decides when a new stage $st_i$ begins by sending a special command $refresh_i$ to each party. Refreshment ends when all honest parties have output a special symbol $\zeta_i$ indicating end of stage $st_i$. Further, A may corrupt parties adaptively throughout the protocol, subject to the limitation that no more than i parties can be corrupt in any stage. In particular, this means that if a party is corrupt during a refreshment phase (either opening or closing period), the party is considered to be corrupt in both of the two stages to which the phase belongs. After corruption, A acts on behalf of the corrupted party. Corruption may be either passive (where the adversary only learns a party's state) or active (where the adversary may arbitrarily control behavior of a party).

If party $P_i$ is corrupted during an operation phase of stage $st_j$, A is given the view of $P_i$ starting from its state at the beginning of the current stage. This models the assumption that all randomness and data used in the previous refreshment phase is erased except for the information that the protocol specifies should be used afterwards.

If the corruption of $P_i$ is made during a refreshment phase which belongs to stages $st_j$ and $st_{j+1}$, A receives the view of $P_i$ starting from its state at the beginning of stage $st_j$, and $P_i$ is assumed to be corrupt for stage $st_{j+1}$.

If $P_i$ is corrupt during the closing period of a refreshment phase in stage $st_j$, A may decide to leave it, which may allow A to corrupt new parties, subject to the bound on t corruptions per stage. In this case, $P_i$ is considered to be decorrupted. The intuition for this is that as long as a party is not corrupted by the opening period of a refreshment stage, it can then receive a new version of its shares and participate in subsequent stages. In practice, $P_i$ will have to be decorrupted before the closing period in order to be considered decorrupted in the subsequent stage.

A decorrupted party immediately starts participating in the protocol as any honest party. In the passive corruption case, the party starts from the correct state specified by the protocol at this point. In the active corruption case, the party starts from a default state after round r. This state is application-dependent in general.

(4.3) Proactive MPC Preliminaries

Outlined below are the various inputs and tools required to execute proactively secure multiparty computation for any functionality.

(4.3.1) Circuit Structure

A functionality f for n parties $P_1, \ldots, P_n$ (denoted together as the set P) is input as an arithmetic circuit. Informally, such a circuit consists of input gates, addition gates (which can be generalized to affine gates), multiplication gates, random gates (where randomized inputs are allowed), and output gates. Note that an arithmetic circuit is, in essence, a generalization of a Boolean circuit where OR gates can be executed by binary addition arithmetic gates, and AND gates can be executed by binary multiplication arithmetic gates. Arithmetic circuits are formally specified below.

input: $G_{gid}=(gid, inp, P_j)$, where $P_j \in P$ provides a secret input $x_{gid} \in F$.

random input: $G_{gid}=(gid, ran)$, where $x_{gid} \in_R F$ is chosen as a secret, uniformly random element.

affine: $G_{gid}=(gid, aff, \alpha_0, gid_1, \alpha_1, \ldots, gid_l, \alpha_l)$, where $\alpha_0, \ldots, \alpha_l \in F$ and $x_{gid}=\alpha_0 + \Sigma_{i=1}^{l} \alpha_i x_{gid_i}$.

multiplication: $G_{gid}=(gid, mul, gid_1, gid_2)$ where $xgid=x_{gid_1} x_{gid_2}$.

output: $G_{gid}=(gid, out)$ where all parties (respectively, some fixed subset of parties) are to learn $x_{gid}$.

(4.3.2) Sharing and Dispute Resolution

Security for the MPC protocol will be enforced so long as parties cannot deal inconsistent sharings. That is, each share sent must correspond to the same shared value. In the present invention, Feldman's Verifiable Secret Sharing (VSS) scheme (see Literature Reference No. 4) was used to do this.

(4.3.2.1) Secret Sharing

A k out of n secret sharing is a share distribution protocol such that only if k+1 shares are combined can the secret be discovered. A secret s is shared as follows:

1. Party $P_i$ picks k random values $\delta_{i,1}, \ldots, \delta_{i,k} \in \mathbb{Z}_q$, log q=κ (where κ is the security parameter). Set polynomial $\delta_i(t)=s+\Sigma \delta_{i,l} t^l$.

2. Party $P_j$ receives share $\delta_i(j)$.

(4.3.2.2) Feldman Verifiable Secret Sharing

In what follows, $ENC_j$ is the public key encryption using-party $P_j$'s public key, while $SIG_j$ is the output of a secure signature scheme using party $P_j$'s private key. It is not important for this protocol which public key encryption or signature scheme is used. It is assumed that all parties possess each others' public keys. The secret sharing scheme above can be made verifiable as follows:

1. Party $P_i$ picks k random values $\delta_{i,1}, \ldots, \delta_{i,k} \in \mathbb{Z}_q$, log q=κ. Set polynomial $\delta_i(t)=s+\Sigma \delta_{i,l} t^l$.

2. $P_i$ computes $\epsilon_{i,m}=g^{\delta_{i,m}}$ for $0 \leq m \leq k$ (where $\delta_{i,0}=s$), where g is a generator in the cyclic, multiplicative group of order q.

3. $P_i$ computes $u_{i,j}=\delta_i(j) \bmod q$, $1 \leq j \leq n$.

4. $P_i$ computes $e_{i,j}=ENC_j(u_{i,j})$.

5. $P_i$ broadcasts the message $VSS_i^{(time)}=(i, time, \{e_{i,j}\}_{j \in \{1, \ldots, n\} \setminus \{i\}})$ and the signature $SIG_i (VSS_i^{(time)})$.

Note that $g^{u_{i,j}}=(\epsilon_{i,0})(\epsilon_{i,1})^j(\epsilon_{i,2})^{j^2} \ldots (\epsilon_{i,k})^{j^k}$ if the sharing is proper. This expression demonstrates that the exponent is the point $\delta_i(j)$ public verification data. This sharing takes three rounds if dispute resolution is included. With dispute resolution, suppose party $P_j$ disputes that he has received a proper share from $P_i$. Upon accusation, $P_i$ broadcasts $u_{i,j}$ and the randomness used to encrypt $u_{i,j}$ as $e_{i,j}$. Note that public key encryption must be used for this reason, as symmetric encryption has no such verifiability. Parties verify that $u_{i,j}$ is properly formed. If so, $P_j$ is marked as corrupted; if not, $P_i$ is marked as corrupted. Note, all accusations must occur in parallel or the adversary can stall the protocol too long. The above collection of protocols are referred to as $VSS_D(i, s, k)$ for VSS (verifiable secret sharing) with disputes by party $P_i$ of share s with threshold k. For notational convenience [s] is the set of secret shares for secret s with threshold k (just the values $\delta_i(j)$), while $\langle s \rangle$ will denote the same except with threshold 2k.

(4.3.2.3) What can be Shared

In actuality, the above is completely secure only when the value being shared is either a sharing of an independently chosen random number or 0. This is because the party broadcasts $g^s$, where s is the secret and g is a generator in the cyclic multiplicative group of order q, as described above. Because a trusted setup is assumed, the initial sharing is executed in the weak sense, without being verifiable, so the structure of the MPC inputs will not be revealed. Then, all other sharings will be randomized or sharings of 0, so no information is revealed because $g^s=1$.

(4.3.2.4) Why VSS?

The prior art revolves around secret sharing, but does not rely on VSS. This is because references such as Literature Reference No. 5 wish to achieve unconditional security, and it is difficult to achieve unconditionally secure VSS in constant rounds that have a high (e.g., <¼ of parties) tolerated rate of corruption. However, references such as Literature Reference No. 5 and 6 have O(n) additional rounds to achieve dispute resolution without VSS. Such an approach suffers here because in previous work, at most O(n) additional rounds were needed because the number of corrupted parties was O(n). In the present invention, however, the number of total corrupted parties is O(Dn) where D is the multiplicative circuit depth and, in particular, each period of time would require at least O(n) rounds to account for dispute resolution, which would drop the total number of players corruptible per round to $O(n^{-2})$, which is too low.

(4.3.3) Proactive Secret Share Renewal and Reconstruction

The proactive secret share renewal and reconstruction to transform a secret sharing protocol into a proactively secure secret sharing protocol is outlined below.

(4.3.3.1) Share Reconstruction

Suppose party $P_r$ was corrupted and after becoming uncorrupted, tries to recover its lost shares. Let $\mathcal{D}$ be the set of parties that still have shares. Note that some may be corrupted. It is assumed that $|\mathcal{D}|>k$, where k is the threshold of corrupted parties.

Suppose secret s corresponds to polynomial f such that $f(r)=x_r$ and $f(0)=s$. The goal is for party $P_r$ to retrieve $x_r$ without the other parties learning $x_r$, and without any party learning s. What the parties do instead is construct a random polynomial g(t) where g(r)=0, and then send $P_r$ enough values of the new polynomial g+f so that $P_r$ can interpolate it. Note that s is hidden because g is a random polynomial with a random constant coefficient and so the constant coeffecient of g+f is randomized. However (f+g)(r)=f(r)+g(r)=$x_r$+0=$x_r$, and so $P_r$ can recover its share.

An important issue will be for $P_r$ to be able to determine that the shares being sent to it are consistent with the shares other parties actually have. For such information to be verifiable, it must be the case that at any given point, each party (not the ones being refreshed) have, for each party $P_i$, $g^{x_i}$. Note that such public information should not leak information about $x_i$ because $x_i$ is, by construction, a random share. Therefore, throughout the protocol, it must be shown that parties can continually update their memory of each other party's random shares. It should be noted that such information (namely, $g^{x_i}$) does not also need to be reconstructed. Rather, each party $P_i$ in the refreshment subprotocol will broadcast its $g^{x_i}$, and only if a majority of parties disagree will $P_i$ be marked as corrupted. Provided below is an example of such a protocol.

1. (a) Each $P_i$, $i \in \mathcal{D}$, picks a random k-degree polynomial $\delta_i$ over $\mathbb{Z}_q$ such that $\delta_i(r)=0$. It can do so randomly by selecting at random $\{\delta_{i,j}\}_{j \in \{1, \ldots, k\}}$ and setting $\delta_{i,0}=\Sigma_j \delta_{i,j} r^j$ mod q.

(b) Each $P_i$ broadcasts $VSS_i=(i, \{g^{\delta_{i,m}} \mod p\}_{m \in 0, \ldots, k}, \{ENC_j; (\delta_i(j))\}_{j \in \mathcal{D}})$ and also broadcasts $SIG_i(VSS_i)$, where $SIG_i$ is the output of a secure signature scheme using party $P_i$'s private key.

2. (a) For all parties $P_j$, $P_j \in \mathcal{D}$, $P_j$ checks $P_i$ locally by verifying that $\Pi_{m \in \{0, \ldots, k\}}(g^{\delta_{i,m}})^r - 1$ mod p and whether $\delta_i(j)$ is consistent with exponents of the coefficients of $\delta_i(\cdot)$ by computing $g^{\delta_i(j)} = \Pi_{m \in \{0, \ldots, k\}}(g^{\delta_{i,m}} j^m$ mod p.

(b) Based on accusation resolution, $P_r$ and uncorrupted parties in $\mathcal{D}$ decide on uncorrupted set $\mathcal{D}' \subset \mathcal{D}$.

3. Each party $P_i \in \mathcal{D}'$ creates its new share of $x_r$, $x'_i = x_i + \Sigma_{j \in \mathcal{D}'} \delta_j(i)$ and broadcasts $REC_i = (i, ENC_r(x'_i))$, and $g^{x_i}$, and $SIG_i(REC_i)$.

4. If parties disagree with the $g^{x_i}$ as corresponding to $P_i$'s share, they broadcast an accusation; if a majority of parties broadcast an accusation, $P_i$ is marked as corrupt (and dropped from $\mathcal{D}'$). If not, each other party making an accusation is dropped from $\mathcal{D}'$. Any party not in $\mathcal{D}'$ is ignored when it broadcasts (or sends any information to any party).

5. (a) $P_r$ decrypts the $x_i$'s and considers the exponents $\{g^{\delta_{i,m}} \mod p\}_{j \in \mathcal{D}, m \in \{0, \ldots, k\}}$ that were broadcasted above. Then, for all $i \in \mathcal{D}'$, $P_r$ takes the current valid exponent $y_i$ of $P_i$'s share (which is $x_i$; $P_r$ knows $g^{x_i}$ from the agreement step above) and verifies that $g^{x_i} = y_i * \Pi_{j \in \mathcal{D}'} g^{\delta_j(i)} = g^{x_i + \Sigma_{j \in \mathcal{D}'} \delta_j(i)}$ mod p, where for all $j \in \mathcal{D}'$, $g^{\delta_j(i)} \leftarrow \Pi_{m \in \{0, \ldots, k\}}(g^{\delta_{j,m}})^{i^m}$ mod p.

(b) $P_r$ obtains the set $\mathcal{D}'' \subset \mathcal{D}'$ of parties broadcasting correct new shares $x'_i$. $P_r$ interpolates these shares to recover $x_r$. By assumption, $|\mathcal{D}''| \geq k+1$).

This subprotocol takes five rounds of communication.

(4.3.3.2) Share Renewal

Here, periods are denoted by t and the threshold of corrupted parties per period is k. The previous share is $x_i^{t-1}$. Suppose the polynomial used to share secret s is f(t) (so that f(0)=s). Then, to re-randomize the shares, a random polynomial r(t) with r(0)=0 and randomly chosen non-constant coefficients is jointly generated by the parties, and shares of s are now (f+r)(i)=f(i)+r(i). Because the coefficients of r(t) were chosen at random, (f+r)(i) is newly random for $i \neq 0$. However, (f+r)(0)=f(0)+r(0)=s+0=s and so the newly random shares are still secret shares of s. Below is an example subprotocol for share renewal.

1. Each party $P_i$ executes $VSS_D(i, 0, k)$ in parallel.
2. Each party $P_i$ decrypts the $e_{i,j}$, $1 \leq j \leq n$, $j \neq i$ to obtain $u_{i,j}$ (which are outputs from the VSS subprotocol).
3. Each party sets $x_i^t = x_i^{t-1} + (u_{1,i} + \ldots u_{n,i})$ mod q, erases $x_i^{t-1}$ and all data associated with it, and keeps only $x_i^t$.
4. Each party $P_i$ computes the exponent of party $P_j$'s share for each $P_j$ by computing $g^{x_j^t} = g^{x_j^{t-1}} \cdot \Pi_{l=0}^{k} g^{\delta_{j,l} j^l}$.

This subprotocol takes three rounds of communication. Note then that the two subprotocols (reconstruction and renewal) together take eight rounds of communication. In fact, they can be interleaved, which will be described below.

(4.3.4) Multiparty Computation from Secret Sharing

Here, the work of Damgard and Nielsen (see Literature Reference No. 5), namely their protocol secure against n/4 corrupted players, is followed. The intuition behind the protocol is to use a "fully homomorphic" secret sharing (not VSS) protocol to securely compute an arithmetic circuit. Preprocessing all random inputs required later in the protocol allows for the bandwidth to be further optimized.

(4.3.4.1) Generating Randomness

The goal of the protocol Double-Random(l) is to generate sharings $[r_1], \ldots, [r_l]$ and $\langle R_1 \rangle, \ldots, \langle R_l \rangle$, where each $[r_1]$ is a uniformly random $r_i$ and each $\langle R_i \rangle$ is a uniformly random 2i-sharing of $R_i = r_i$. The case where l=n−t is considered for simplicity.

As part of the protocol, the parties use fixed matrix $M = Van^{(n,n-t)^T}$, where $Van^{(r,c)}$ denotes a fixed Van der Monde matrix with r rows and c<r columns. Below is an example protocol for Double-Random(l).

1. Each $P_i \in \mathcal{P}$: Pick a uniformly random value $s^{(i)} \in_R F$ and deal a t-sharing $[s^{(i)}]$ using $VSS_D(i, s^{(i)}, t)$ 2t-sharing $\langle s^{(i)} \rangle$ using $VSS_D(i, s^{(i)}, 2t)$. In Literature Reference No. 5, additional work was needed to demonstrate that [s] and $\langle s \rangle$ correspond to the same s, but in the present invention it is immediate because $g^{s^{(i)}}$ is sent as the first coefficient for both settings.

2. Compute $([r_1], \ldots, [r_{n-t}]) = M([s^{(1)}], \ldots, [s^{(n)}])$ and $(\langle R_1 \rangle, \ldots \langle R_{n-t} \rangle = M(\langle s^{(1)} \rangle, \ldots, \langle s^{(n)} \rangle))$, and output $(([r_1], \langle\!\langle R_1 \rangle\!\rangle), \ldots ([r_{n-t}], \langle\!\langle R_{n-t} \rangle\!\rangle))$ 3. Each party can compute each other party's shares in the exponent. This is because matrix multiplication is a series of inner products, and such products can be computed in the exponent: if $\vec{v} = (v_1, \ldots, v_m)$ and $\vec{w} = (w_1, \ldots w_m)$, then if $\vec{v}$ is only publicly known as $(g^{v_1}, \ldots g^{v_m})$, $g^{\vec{v} \cdot \vec{w}}$ can be computed by computing $\Pi(g^{v_i})^{w_i}$.

Denote by Random(l) the subprotocol that acts as above except that it does not compute the 2t-sharings (i.e., it only computes the t-sharings). This subprotocol takes three rounds of communication, it takes as many rounds as it takes to execute $VSS_D$.

(4.3.4.2) Opening Sharings

Described below is how to open sharings even in the presence of corruption. Recall that the Berlekamp Welch (hereinafter referred to as BW) algorithm (described in U.S. Pat. No. 4,633,470, which is hereby incorporated by reference as though fully set forth herein) correctly constructs the polynomial f(X) used to compute the secret value x of [x] in the face of at least n−t correct shares and at most t incorrect shares.

The initial subprotocol Open($P_{king}$, d, [x]) is used as follows:
1. The parties agree on a consistent d-sharing [x] with d≤2t.
2. Each $P_i \in \mathcal{P}$: send the share $x_i$ of [x] to $P_{king}$.
3. $P_{king}$: Execute BW on all the $x_i$ to obtain x, send x to all parties.

The issue here is that $P_{king}$ can lie. Therefore, the invention described herein expands the number of shares being opened, allows all the parties and $P_{king}$ to act, and uses the fact that no more than t of them can be corrupted as described below.

OpenRobust(d, $[x_1]$, ..., $[x_l]$):
1. The parties agree on consistent d-sharings $[x_1]$, ..., $[x_l]$ with l=n−(2t+1) and d≤2t.
2. All parties: Compute $([y^{(1)}], \ldots, [y^{(n)}]) = M([x_1], \ldots, [x_l])$, where M=Va$n^{n,l}$.
3. All parties: For each $P_i \in \mathcal{P}$ in parallel, execute $y^{(i)} \leftarrow \text{Open}(P_i, d, [y^{(i)}])$.
4. All parties: Execute BW on the $y^{(i)}$ to obtain $x_1, \ldots, x_l$.

This subprotocol takes three rounds of communication.

(4.3.4.3) Multiplication Triples

A protocol referred to as Triples(l) which allows the parties to output l tuples ([a], [b], [c]) such that c=ab and a, b are uniformly random, is described below.
1. All parties: Execute Random(2l) and Double-Random (l) and group the outputs in l triples ([a], [b], ([r], ⟨R⟩)). For each triple in parallel, proceed as follows:
   (a) All parties: Compute ⟨D⟩=[a][b]+⟨R⟩.
   (b) Execute D←OpenRobust(2t, ⟨D⟩).
   (c) All parties: Compute [c]=D−[r], and output ([a], [b], [c]).
2. Parties can compute other parties shares in the exponent because they already have other parties' shares for [a], [b], [r] and ⟨R⟩, , so if $x_j$ is the share for c of party $P_j$ and $y_j$ is the share for r of party $P_j$, $g^{x_j} = g^D \cdot g^{-y_j}$.

From this subprotocol, the number of corrupted parties jumps to n/4. This is because multiplying shares increases the threshold to 2k. If one can drop this protocol so that it is robust against n/2 parties, then the whole MPC protocol will be secure against n/2 parties. This subprotocol takes six rounds: three for Random and Double-Random and three for OpenRobust.

(4.3.4.4) Preprocessing

Below is a list of the subprotocols that are executed in preprocessing.
1. random: Let r be the number of random gates in the circuit Circ, execute Random(r) and associate one t-sharing $[x_{gid}]$ to each (gid , ran)∈Circ.
2. multiplication: Let m be the number of multiplication gates, execute Triples(m) and associate one multiplication triple ($[a_{gid}]$, $[b_{gid}]$, $[c_{gid}]$) to each (gid, mul, $gid_1$, $gid_2$)∈Circ.

In the proactive setting, preprocessing should not all be done at the beginning of the protocol. The reason is that, unlike in the standard setting, parties at each new period will have to refresh/reconstruct held data, which would include the preprocessed randomness. The only way to obviate such overhead is to preprocess dynamically, which is to say just before it needs to be used.

(4.3.4.5) Circuit Evaluation

Circuit evaluations occur by computing gates at the same multiplicative depth in parallel. Below are example protocols for circuit evaluation for input, affine, multiplication, and output.

input: For each (gid, inp, $P_j$)∈Circ:
1. $P_j$: Retrieve the input $x_{gid} \in F$ and send $[x_{gid}]$ to all parties. Further, $P_j$ broadcasts $g^{x_i}$ for each party $P_i$, where $x_i$ is the share for $P_i$ of $[g_{gid}]$. This assumes Trusted Setup. This step takes one round of communication.

affine: For (gid, aff, $\alpha_0$, $gid_1$, $\alpha_1$, ..., $gid_l$, $\alpha_l$)∈Circ: All parties compute $[x_{gid}] = \alpha_0 + \Sigma_{i=1}^{l} \alpha_i [x_{gid_i}]$. Parties can compute other parties' shares in the exponent by virtue of the fact that exponentiation is additively homomorphic. This step takes zero rounds of communication.

multiplication: For (gid, mul, $gid_1$, $gid_2$)∈Circ, all parties proceed as follows:
1. Compute $[\alpha_{gid}] = [x_{gid_1}] + [a_{gid}]$ and $[\beta_{gid}] = [x_{gid_2}] + [b_{gid}]$.
2. Execute $\alpha_{gid} \leftarrow \text{OpenRobust}([\alpha_{gid}])$ and $\beta_{gid} \leftarrow \text{OpenRobust}([\beta_{gid}])$.
3. Let $[x_{gid}] = \alpha_{gid}\beta_{gid} - \alpha_{gid}[b_{gid}] - \beta_{gid}[a_{gid}] + [c_{gid}]$.
4. Parties can compute other parties' shares in the exponent by virtue of the fact that exponentiation is additively homomorphic.

This step takes three rounds of communication.

output: For (gid, out)∈Circ; Execute $x_{gid} \leftarrow \text{OpenRobust}([x_{gid}])$. This step takes three rounds of communication.

(4.4) Proactive MPC Protocol

In the following protocol, the proactive multiparty computation protocol is outlined.

(4.4.1) Proactive Secret Share Renewal and Reconstruction for MPC

Share renewal and reconstruction for individual secrets were described above. In the case of MPC, many secrets will simultaneously be renewed and reconstructed. To allow for such parallelized execution, the Feldman VSS-based renewal and reconstruction protocol was modified.

(4.4.1.1) MPC Share Reconstruction

Here, $P_r$ needs to recover many shares $x_r^1, \ldots, x_r^l$ corresponding to secrets $s^1, \ldots, s^l$. Let f be the polynomial to which $P_r$ requires the value f(r). The idea is to construct, for each $P_r$, a random polynomial h such that h(r)=0; then $P_r$ can interpolate f+h, and obtain f(r)=(f+h)(r)−f(r)+h(r)=f(r)+0. In practice, parties will construct k−1 degree random polynomials, and ensure that they evaluate to 0 at r by multiplying by the term (x−r), where x is the free variable.

Preliminary Step (not specific to a $P_r$ being reconstructed):
1. (a) All parties $P_i$, i∈$\mathcal{D}$, jointly select a random k−1 degree polynomial $\delta_j$ over $\mathbb{Z}_q$ for each party $P_j$, j∈$\mathcal{D}$ in the following way: Set $$k' = \left\lceil \frac{n}{n-k} \right\rceil$$

(without loss of generality it is assumed that n−k is a factor of n). Each $P_i$ selects $u'_{i,1}, \ldots u'_{i,l}$, uniformly and independently at random and executes $\text{VSS}_D(i, u'_{i,j}, k-1)$ for each j, 1≤j≤k'. Denote by $\delta_{u'_{i,j}}$ the k−1 degree polynomial corresponding to the sharing of $u'_{i,j}$.

(b) Let $\mathcal{D}'$ denote the set of players agreed upon as honest after all parties execute $\text{VSS}_D$. Let M be a (n−k)×n Vandermonde matrix. Each party computes their shares of $(u_{(\tau-1)(n-k)+1}, \ldots, u_{\tau(n-t)}) = M(u'_{1,\tau}, \ldots, u_{n,\tau})^T$ for $1 \leq \tau \leq k'$, where $u_{j,\tau} = 0$ if $j \notin \mathcal{D}$. Note that $k' \cdot (n-k) = n$ uniformly random polynomials are generated in this way via the randomness extraction properties of Van der Monde matrices. Therefore, at this stage each honest party has shares of uniformly random k−1 sharings of $u_1, \ldots, u_n$. Let $\delta_{u_i}$ be the k−1 degree polynomial corresponding to $u_i$. Then recall by the algebraic property of secret sharings that each party can compute $g^{\delta_{u_i}(j)}$ for any party $P_j$.

Computation to Reconstruct for each $P_r$:

1. For each b, $1 \leq b \leq l$ in parallel, each party $P_i \in \mathcal{D}'$ creates its new share of $x_r^b$, $x'^b_i = x_i^b + (i-r)[u_r]_i$ where $[u_r]$ corresponds to $P_i$'s share of the random polynomial corresponding to $u_r$, and broadcasts $REC_i = (i, ENC_r(x'^b_i))$, $g^{x_i^b}$ and $SIG_i(REC_i)$.

2. If parties disagree with the $g^{x_i^b}$ as corresponding to $P_i$'s share, they broadcast an accusation; if a majority of parties broadcast an accusation, $P_i$ is marked as corrupt and dropped from $\mathcal{D}'$. If not every party making an accusation is dropped from $\mathcal{D}'$. Any party not in $\mathcal{D}'$ is ignored when it broadcasts (or sends any information to any party).

3. (a) $P_r$ decrypts the $x'^b_i$s. Then, for all $i \in \mathcal{D}'$, $P_r$ takes the current valid exponent $y_i^b$ of $P_i$'s share (which is $x_i^b$; $P_r$ knows $g^{x_i^b}$ from the agreement step above) and verifies the following:

$g^{x'^b_i} = y_i^b * (g^{\delta_{u_r}(i)})^{i-r} = g^{x_i^b + (i-r)u_r}$, mod p, where for all $j \in \mathcal{D}'$, $g^{\delta_j(i)} \leftarrow \Pi_{m \in \{0, \ldots k\}} (g^{\delta_{j,m}})^{i^m}$ mod p.

(b) $P_r$ obtains the set $\mathcal{D}'' \subset \mathcal{D}'$ of parties broadcasting correct new shares $x'_i$. $P_r$ interpolates these shares to recover $x_r$. By assumption, $|\mathcal{D}''| \geq k+1$. This subprotocol takes five rounds of communication.

(4.4.1.2) MPC Share Renewal

Here, periods are donated by t and the threshold is k. The previous share is $x_i^{t-1}$. Suppose the polynomial used to share secret s is f(t) so that f(0)=s. Here, parties renew shares $x_{i,b}^{t-1}$ for the shares for party $P_i$ of secret $s^b$, for secrets $s^1, \ldots, s^l$.

1. Each party $P_i$ executes $VSS_D(i, 0, k)$ in parallel.
2. Each party $P_i$ decrypts the $e_{i,j}$, $1 \leq j' \leq n$, $j \neq i$ to obtain $u_{i,j}$ (obtained from the VSS subprotocol in the previous step).
3. Each party sets $x_{i,b}^t = x_{i,b}^{t-1} + (u_{1,i} + \ldots + u_{n,i})$ mod q, erases $x_{i,b}^{t-1}$ and all data associated with it, and keeps only $x_{i,b}^t$.
4. However, note that if $P_i$ finds irregularities, the party broadcasts a signed accusation against that party.
5. Each party $P_i$, computes the exponent of party $P_j$'s shares, for each party $P_j$, by computing $g^{x_{j,b}^t} = g^{x_{j,b}^{t-1}} \cdot \Pi_{l=0}^t g^{\delta_{j,l} j^l}$.

This subprotocol takes three rounds of communication. Note then that the two subprotocols (MPC reconstruction and MPC renewal) together take eight rounds of communication.

(4.4.2) Proactively Secure MPC Protocol

The following is a description of the proactively secure MPC protocol. Let f be a functionality to be computed by n parties specified by circuit C. Let $MPC_C$ be the MPC protocol as specified above. The proactively secure MPC protocol $\pi_f$ based on $MPC_C$ is specified in phases. $\alpha$ denotes the number of rounds of communication required by protocol $MPC_C$ in the non-proactive setting.

In the initial phase $ph_0$, each party $P_i$ has input $s_i$ to the functionality f. Parties construct secret shares for each $s_i$ by constructing random polynomials f'(t) such that $f'(0) = s_i$. Each party broadcasts $ENC_j(x_{i,j}) = f'(j)$ as well as $g^{x^{ij}}$. Note that outputs are trusted by assumption in this phase (and in no other).

A computation phase $ph_{2j+1}$ occurs for each j, $1 \leq j \leq \alpha$. Here, parties execute the protocol $MPC_C$ where computation in consecutive (odd) phases of $\pi_f$ corresponds to consecutive rounds of computation of $MPC_C$. Such computation rounds include the dynamic preprocessing described above.

The only subprotocol executions that cannot be executed across multiple computation phases are OpenRobust and Random. In particular, Triples can be executed across two computation phases, where in the first computation phase, Random is executed and in the second computation phase, OpenRobust is executed. Therefore, the minimal number of required rounds for a computation phase is three.

A refreshment phase $ph_{2j}$ occurs for each j, $1 \leq j \leq \alpha-1$. The closing refreshment phase consists of executing the MPC share renewal subprotocol on any shares to be required later in the $MPC_C$ protocol. The opening refreshment phase consists of executing the MPC share reconstruction subprotocol on any shares to be required later in the $MPC_C$ protocol.

FIG. 1 is a flow diagram illustrating the proactively secure MPC according to the principles of the present invention. Secret shares representing data are constructed to perform computations between a plurality of parties 100. A number of rounds of communication where the plurality of parties jointly compute on the secret shares is specified 102. A threshold of a number of the plurality of parties that can be corrupted by an adversary is also specified 104. The secret shares are periodically refreshed and reshared among the plurality of parties before and after computations in each of the rounds of communication 106, such that data the secret shares represent is proactively secured.

(4.4.3) Security of $\pi_f$ $MPC_C$ can be shown to be secure against n/4 cheating parties, as shown in table 200 of FIG. 2. From opening to computation to closing phases takes at most eleven rounds of communication (eight for the refreshment phase and three for the computation phase) and, therefore, the protocol according to the principles of the present invention is secure against at most $$\frac{n}{4 \cdot 11} = \frac{n}{44}$$

cheating parties per round of interaction, assuming a rate of n/4 corruptions per stage. In table 200, C denotes circuit size, D denotes multiplicative depth, w denotes circuit width, n denotes number of parties, and κ denotes a security parameter.

Figure 3:
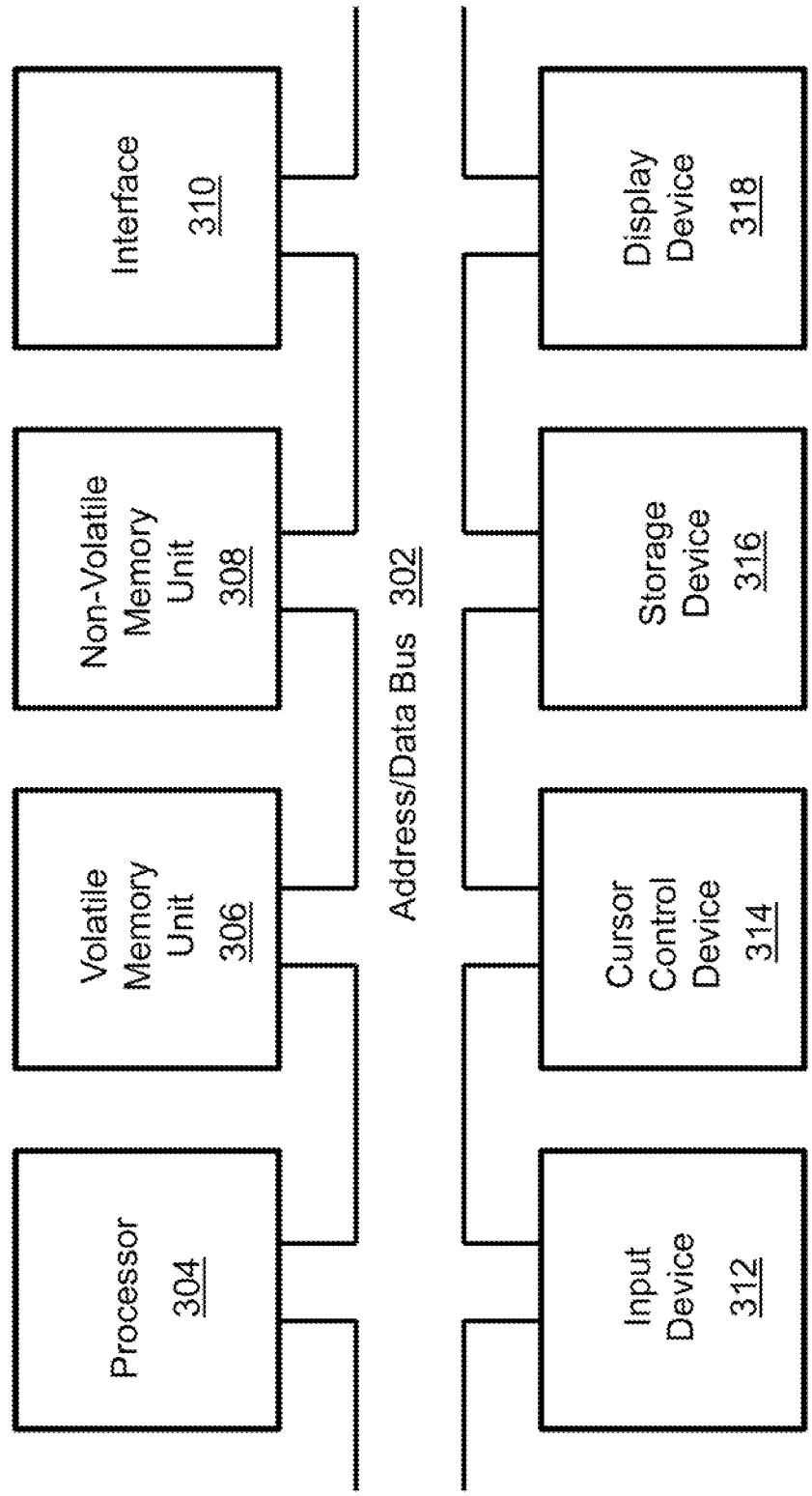
FIG. 3 is an illustration of a data processing system according to principles of the present invention.

An example of a computer system 300 in accordance with one aspect is shown in FIG. 3. The computer system 300 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 300. When executed, the instructions cause the computer system 300 to perform specific actions and exhibit specific behavior, such as described herein.

The computer system 300 may include an address/data bus 302 that is configured to communicate information. Additionally, one or more data processing units, such as a processor 304, are coupled with the address/data bus 302. The processor 304 is configured to process information and instructions. In one aspect, the processor 304 is a microprocessor. Alternatively, the processor 304 may be a different type of processor such as a parallel processor, or a field programmable gate array.

The computer system 300 is configured to utilize one or more data storage units. The computer system 300 may include a volatile memory unit 306 (e.g., random access memory ("RAM"), static RAM, dynamic RAM, etc.) coupled with the address/data bus 302, wherein a volatile memory unit 306 is configured to store information and instructions for the processor 304. The computer system 300 further may include a non-volatile memory unit 308 (e.g., read-only memory ("ROM"), programmable ROM ("PROM"), erasable programmable ROM ("EPROM"), electrically erasable programmable ROM "EEPROM"), flash memory, etc.) coupled with the address/data bus 302, wherein the non-volatile memory unit 308 is configured to store static information and instructions for the processor 304. Alternatively, the computer system 300 may execute instructions retrieved from an online data storage unit such as in "Cloud" computing. In an embodiment, the computer system 300 also may include one or more interfaces, such as an interface 310, coupled with the address/data bus 302. The one or more interfaces are configured to enable the computer system 300 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 300 may include an input device 312 coupled with the address/data bus 302, wherein the input device 312 is configured to communicate information and command selections to the processor 300. In accordance with one aspect, the input device 312 is an alphanumeric input device, such as a keyboard, that may include alphanumeric and/or function keys. Alternatively, the input device 312 may be an input device other than an alphanumeric input device. In one aspect, the computer system 300 may include a cursor control device 314 coupled with the address/data bus 302, wherein the cursor control device 314 is configured to communicate user input information and/or command selections to the processor 300. In one aspect, the cursor control device 314 is implemented using a device such as a mouse, a track-ball, a track-pad, an optical tracking device, or a touch screen. The foregoing notwithstanding, in one aspect, the cursor control device 314 is directed and/or activated via input from the input device 312, such as in response to the use of special keys and key sequence commands associated with the input device 312. In an alternative aspect, the cursor control device 314 is configured to be directed or guided by voice commands.

In one aspect, the computer system 300 further may include one or more optional computer usable data storage devices, such as a storage device 316, coupled with the address/data bus 302. The storage device 316 is configured to store information and/or computer executable instructions. In one aspect, the storage device 316 is a storage device such as a magnetic or optical disk drive (e.g., hard disk drive ("HOD"), floppy diskette, compact disk read only memory ("CD-ROM"), digital versatile disk ("DVD")). Pursuant to one aspect, a display device 318 is coupled with the address/data bus 302, wherein the display device 318 is configured to display video and/or graphics. In one aspect, the display device 318 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 300 presented herein is an example computing environment in accordance with one aspect. However, the non-limiting example of the computer system 300 is not strictly limited to being a computer system. For example, one aspect provides that the computer system 300 represents a type of data processing analysis that may be used in accordance with various aspects described herein. Moreover, other computing systems may also be implemented. Indeed, the spirit and scope of the present technology is not limited to any single data processing environment. Thus, in one aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, one aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 4:
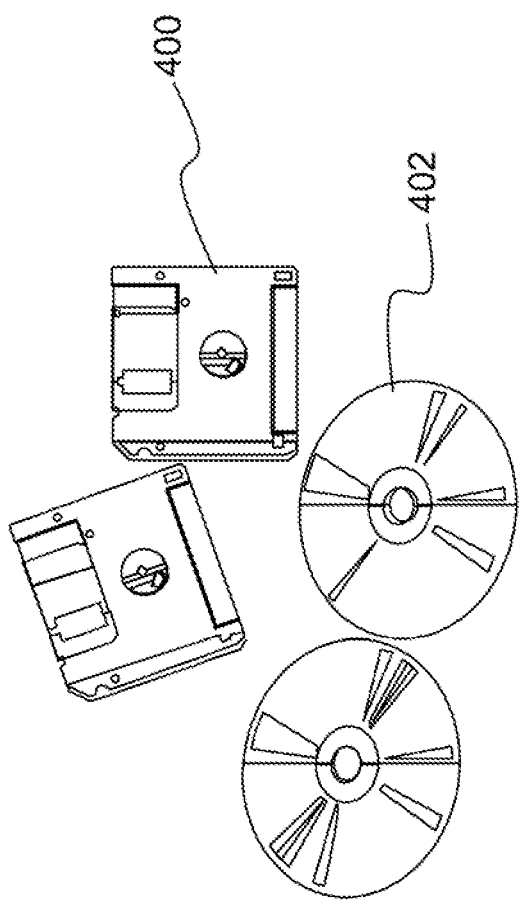
FIG. 4 is an illustration of a computer program product according to principles of the present invention.

An illustrative diagram of a computer program product embodying an aspect of the present invention is depicted in FIG. 4. As a non-limiting example, the computer program product is depicted as either a floppy disk 400 or an optical disk 402. However, as mentioned previously, the computer program product generally represents computer readable code (i.e., instruction means or instructions) stored on any compatible non-transitory computer readable medium.

What is claimed is:

1. A system for proactively secure multi-party computation (MPC), the system comprising:
a plurality of computing devices, each computing device having one or more processors and a non-transitory memory having instructions encoded thereon such that when the instructions are executed, one or more of the computing devices perform operations of:
constructing secret shares representing data to perform computations between the plurality of computing devices modeled as probabilistic polynomial-time interactive turing machines;
specifying a number of rounds of communication where the plurality of computing devices jointly compute on the secret shares;
specifying a threshold of a number of the plurality of computing devices that can be corrupted by an adversary;
periodically refreshing and resharing the secret shares among the plurality of computing devices before and after computations in each of the rounds of communication;
wherein the data the secret shares represent is proactively secured such that a computation is securely executed by the plurality of computing devices while maintaining functionality and security despite successful corruption of the plurality of computing devices; and wherein for any of a plurality of distinct functionalities that can be described by an arithmetic circuit, a group of n computing devices in the plurality of computing devices can jointly and securely compute the functionality despite corruption of up to n/4 of the computing devices.

2. The system as set forth in claim 1, wherein the proactively secure MPC proceeds in phases, wherein a phase comprises a plurality of consecutive rounds of communication, where each round belongs to one phase, and wherein each phase is one of a refreshment phase or an operation phase, wherein during an operation phase, the functionality is computed and during a refreshment phase, the data is rerandomized.

3. The system as set forth in claim 2, wherein a refreshment phase comprises an opening period and a closing period, and wherein a stage comprises an opening refreshment period, an operation phase, and a closing refreshment period, wherein stages are executed consecutively, and wherein no more than t computing devices can be corrupted at any stage by the adversary.

4. The system as set forth in claim 3, wherein the one or more processors further perform an operation of executing, during the closing refreshment period, a share renewal subprotocol on selected set of secret shares, wherein during the share renewal subprotocol, the selected set of secret shares are simultaneously renewed to generate newly random shares that are still secret shares.

5. The system as set forth in claim 3, wherein the one or more processors further perform an operation of executing, during the opening refreshment period, a share reconstruction subprotocol on a selected set of secret shares, wherein during the share reconstruction subprotocol, a computing device $P_r$ is corrupted and, after being corrupted, wants to recover its lost secret shares, wherein the plurality of computing devices construct a random polynomial and send computing device $P_r$ values of the random polynomial so that computing device $P_r$ can interpolate it to recover the lost secret shares.

6. The system as set forth in claim 1, wherein the operation phase comprises a dynamic preprocessing phase for preprocessing data as needed throughout the operation phase.

7. The system as set forth in claim 1, wherein the data the secret shares represent is insusceptible to computer virus infection by an adversary.

8. A computer-implemented method for proactively secure multi-party computation (MPC), comprising:

an act of causing one or more of a plurality of computing devices having one or more processors to execute instructions stored on a non-transitory memory such that upon execution, one or more of the computing devices performs operations of:

constructing secret shares representing data to perform computations between the plurality of computing devices modeled as probabilistic polynomial-time interactive turing machines;

specifying a number of rounds of communication where the plurality of computing devices jointly compute on the secret shares;

specifying a threshold of a number of the plurality of computing devices that can be corrupted by an adversary;

periodically refreshing and resharing the secret shares among the plurality of computing devices before and after computations in each of the rounds of communication;

wherein the data the secret shares represent is proactively secured such that a computation is securely executed by the plurality of computing devices while maintaining functionality and security despite successful corruption of the plurality of computing devices; and wherein for any of a plurality of distinct functionalities that can be described by an arithmetic circuit, a group of n computing devices in the plurality of computing devices can jointly and securely compute the functionality despite corruption of up to n/4 of the computing devices.

9. The method as set forth in claim 8, wherein the proactively secure MPC proceeds in phases, wherein a phase comprises a plurality of consecutive rounds of communication, where each round belongs to one phase, and wherein each phase is one of a refreshment phase or an operation phase, wherein during an operation phase, the functionality is computed and during a refreshment phase, the data is rerandomized.

10. The method as set forth in claim 9, wherein a refreshment phase comprises an opening period and a closing period, and wherein a stage comprises an opening refreshment period, an operation phase, and a closing refreshment period, wherein stages are executed consecutively, and wherein no more than t computing devices can be corrupted at any stage by the adversary.

11. The method as set forth in claim 10, wherein the data processor further performs an operation of executing, during the closing refreshment period, a share renewal subprotocol on selected set of secret shares, wherein during the share renewal subprotocol, the selected set of secret shares are simultaneously renewed to generate newly random shares that are still secret shares.

12. The method as set forth in claim 10, wherein the data processor further performs an operation of executing, during the opening refreshment period, a share reconstruction subprotocol on a selected set of secret shares, wherein during the share reconstruction subprotocol, a computing device $P_r$ is corrupted and, after being corrupted, wants to recover its lost secret shares, wherein the plurality of computing devices construct a random polynomial and send computing device $P_r$ values of the random polynomial so that computing device $P_r$ can interpolate it to recover the lost secret shares.

13. The method as set forth in claim 8, wherein the operation phase comprises a dynamic preprocessing phase for preprocessing data as needed throughout the operation phase.

14. A computer program product for proactively secure multi-party computation (MPC), the computer program product comprising computer-readable instructions stored on a non-transitory computer-readable medium that are executable by one or more of a plurality of computing devices having one or more processors for causing one or more of the computing devices to perform operations of:

constructing secret shares representing data to perform computations between a plurality of computing devices modeled as probabilistic polynomial-time interactive tuning machines;

specifying a number of rounds of communication where the plurality of computing devices jointly compute on the secret shares;

specifying a threshold of a number of the plurality of computing devices that can be corrupted by an adversary;

periodically refreshing and resharing the secret shares among the plurality of computing devices before and after computations in each of the rounds of communication;

wherein the data the secret shares represent is proactively secured such that a computation is securely executed by the plurality of computing devices while maintaining functionality and security despite successful corruption of the plurality of computing devices; and wherein for any of a plurality of distinct functionalities that can be described by an arithmetic circuit, a group of n computing devices in the plurality of computing devices can jointly and securely compute the functionality despite corruption of up to n/4 of the computing devices.

15. The computer program product as set forth in claim 14, wherein the proactively secure MPC proceeds in phases, wherein a phase comprises a plurality of consecutive rounds of communication, where each round belongs to one phase, and wherein each phase is one of a refreshment phase or an operation phase, wherein during an operation phase, the functionality is computed and during a refreshment phase, the data is rerandomized.

16. The computer program product as set forth in claim 15, wherein a refreshment phase comprises an opening period and a closing period, and wherein a stage comprises an opening refreshment period, an operation phase, and a closing refreshment period, wherein stages are executed consecutively, and wherein no more than t computing devices can be corrupted at any stage by the adversary.

17. The computer program product as set forth in claim 16, further comprising instructions for causing the processor to perform an operation of executing, during the closing refreshment period, a share renewal subprotocol on selected set of secret shares, wherein during the share renewal subprotocol, the selected set of secret shares are simultaneously renewed to generate newly random shares that are still secret shares.

18. The computer program product as set forth in claim 16, further comprising instructions for causing the processor to perform an operation of executing, during the opening refreshment period, a share reconstruction subprotocol on a selected set of secret shares, wherein during the share reconstruction subprotocol, a computing device $P_r$ is corrupted and, after being corrupted, wants to recover its lost secret shares, wherein the plurality of computing devices construct a random polynomial and send computing device $P_r$ values of the random polynomial so that computing device $P_r$ can interpolate it to recover the lost secret shares.

19. The computer program product as set forth in claim 14, wherein the operation phase comprises a dynamic preprocessing phase for preprocessing data as needed throughout the operation phase.

* * * * *